(12) United States Patent
Thomas

(10) Patent No.: US 7,882,374 B2
(45) Date of Patent: Feb. 1, 2011

(54) METHOD OF POWERING UP A PORTABLE TERMINAL AND AVOIDING UNDESIRABLE POWERING UP

(75) Inventor: Arnaud Thomas, Change (FR)

(73) Assignee: ST-Ericsson SA, Geneva (CH)

( * ) Notice: Subject to any disclaimer, the term of this patent is extended or adjusted under 35 U.S.C. 154(b) by 672 days.

(21) Appl. No.: 11/915,452

(22) PCT Filed: May 24, 2006

(86) PCT No.: PCT/IB2006/051659

§ 371 (c)(1),
(2), (4) Date: Nov. 26, 2007

(87) PCT Pub. No.: WO2006/126170

PCT Pub. Date: Nov. 30, 2006

(65) Prior Publication Data

US 2009/0044001 A1 Feb. 12, 2009

(30) Foreign Application Priority Data

May 25, 2005 (EP) .................................. 05300411

(51) Int. Cl.
*G06F 1/00* (2006.01)
*G06F 9/00* (2006.01)
*G06F 3/00* (2006.01)
(52) U.S. Cl. .............................. 713/300; 713/2; 710/10
(58) Field of Classification Search .................. 713/300
See application file for complete search history.

(56) References Cited

U.S. PATENT DOCUMENTS

| 3,660,826 | A | | 5/1972 | Lins |
| 4,845,772 | A | * | 7/1989 | Metroka et al. ............. 455/574 |
| 5,812,954 | A | * | 9/1998 | Henriksson .................. 455/566 |
| 5,845,136 | A | | 12/1998 | Babcock |
| 6,449,492 | B1 | * | 9/2002 | Kenagy et al. ........... 455/550.1 |
| 6,647,512 | B1 | | 11/2003 | James et al. |
| 7,111,083 | B2 | * | 9/2006 | Miller ......................... 710/10 |
| 7,602,377 | B2 | * | 10/2009 | Kim ............................ 345/169 |
| 2002/0144030 | A1 | | 10/2002 | Miller |
| 2006/0030367 | A1 | * | 2/2006 | Cowsky et al. .............. 455/565 |

* cited by examiner

*Primary Examiner*—Suresh K Suryawanshi
(74) *Attorney, Agent, or Firm*—William J. Kubida; Hogan Lovells US LLP

(57) ABSTRACT

A method of powering up a portable terminal, which automatically executes a software program when powered on, the terminal having a manually operated power-up key, wherein the method comprises the step of: a) at the beginning, moving (in 32) the key from an idle position in which the terminal is powered off to an active position in which the terminal is powered up, then b) before a first predetermined time interval ($\Delta 1$) has elapsed since the beginning of step a), starting (in 36) to run the software program on the terminal, the first time interval being long enough to check that the key has not been inadvertently moved, then c) when the first time interval elapsed, if the key is still in the active position, continuing (in 42) to run the software program, else powering down the terminal (in 40).

7 Claims, 2 Drawing Sheets

METHOD OF POWERING UP A PORTABLE TERMINAL AND AVOIDING UNDESIRABLE POWERING UP

FIELD OF THE INVENTION

The present invention relates to a method of powering up a terminal, a memory and a terminal thereof.

BACKGROUND OF THE INVENTION

Typically, portable terminals have a manually operated power-up key to switch on the terminal.

At the beginning of known methods, the key is moved from an idle position in which the terminal is powered off, to an active position in which the terminal is to be powered on. For example, the key is depressed.

If at the end of a predetermined time interval, the key is still in the active position, the terminal automatically starts running a software program.

The predetermined time interval is typically longer than 1 second to avoid that an inadvertent contact on the key definitely triggers the powering up of the portable terminal. For example, inadvertent contact on the key often occurs when transporting the portable terminal.

Delaying an action to be taken after a key is depressed is known from U.S. Pat. No. 3,660,826 to allow bounces that occur when the key is depressed to cease, for example.

On the one hand, it is important to limit such undesirable powering up as much as possible because this consumes energy and reduces the battery autonomy of the portable terminal.

On the other hand, waiting for the predetermined time interval to have elapsed, makes the method of powering up the terminal too long for the user. Indeed, the user has to wait for the predetermined time interval and then for the time necessary to initialize the software program. The user can fully use his portable terminal only when the initialization of the software program has finished.

SUMMARY OF THE INVENTION

Accordingly, it is an object of the invention to provide a method of powering up a portable terminal that is faster than the known methods.

With the foregoing and other objects in view there is provided in accordance with the invention a method of powering up a portable terminal comprising:

a) at the beginning, moving the key from an idle position, in which the terminal is powered off to an active position in which the terminal is to be powered on, then b) before a first predetermined time interval has elapsed since the beginning of step a), starting to run the software program on the terminal, the first time interval being long enough to check that the key has not been inadvertently moved, then c) when the first time interval has elapsed, if the key is still in the active position, continuing to run the software program, else powering down the terminal.

In the above method, the running of the software program starts before the first predetermined time interval ends. Therefore, the initialization of the software program starts earlier than in known methods. As a result, the user can fully use his terminal earlier than if using known methods. Furthermore, undesirable powering up is still avoided because the terminal is automatically powered off if the key is no more in its active position at the end of the first time interval.

The embodiments of the method of powering up a portable terminal may comprise one or several of the following features:
  step b) is only triggered after a second time interval has elapsed, the second time interval being shorter than the first time interval and being used to cause bounces to cease that occur when the key is moved,
  during a third time interval beginning when the second time interval has elapsed and ending when the first time interval has elapsed, the method comprises a step of checking that the key continuously remains in the active position during the third time interval,
  the first time interval is longer than 500 ms and shorter than 3 s,
  the second time interval is longer than 5 ms and shorter than 100 ms.

The embodiments of the above method offer the following advantages:
  the use of a second time interval to cause bounces to cease limits the number of inadvertent terminal powering up and so increases the battery autonomy of the terminal,
  checking that the key continuously remains in the active position during the third time interval avoids powering up the terminal when a succession of short moves is applied to the key.

The invention also relates to a memory for implementing the above method and to a terminal designed to implement the above method.

These and other aspects of the invention will be apparent from the following description, drawings and claims.

DESCRIPTION OF THE PREFERRED EMBODIMENTS

Figure 1:
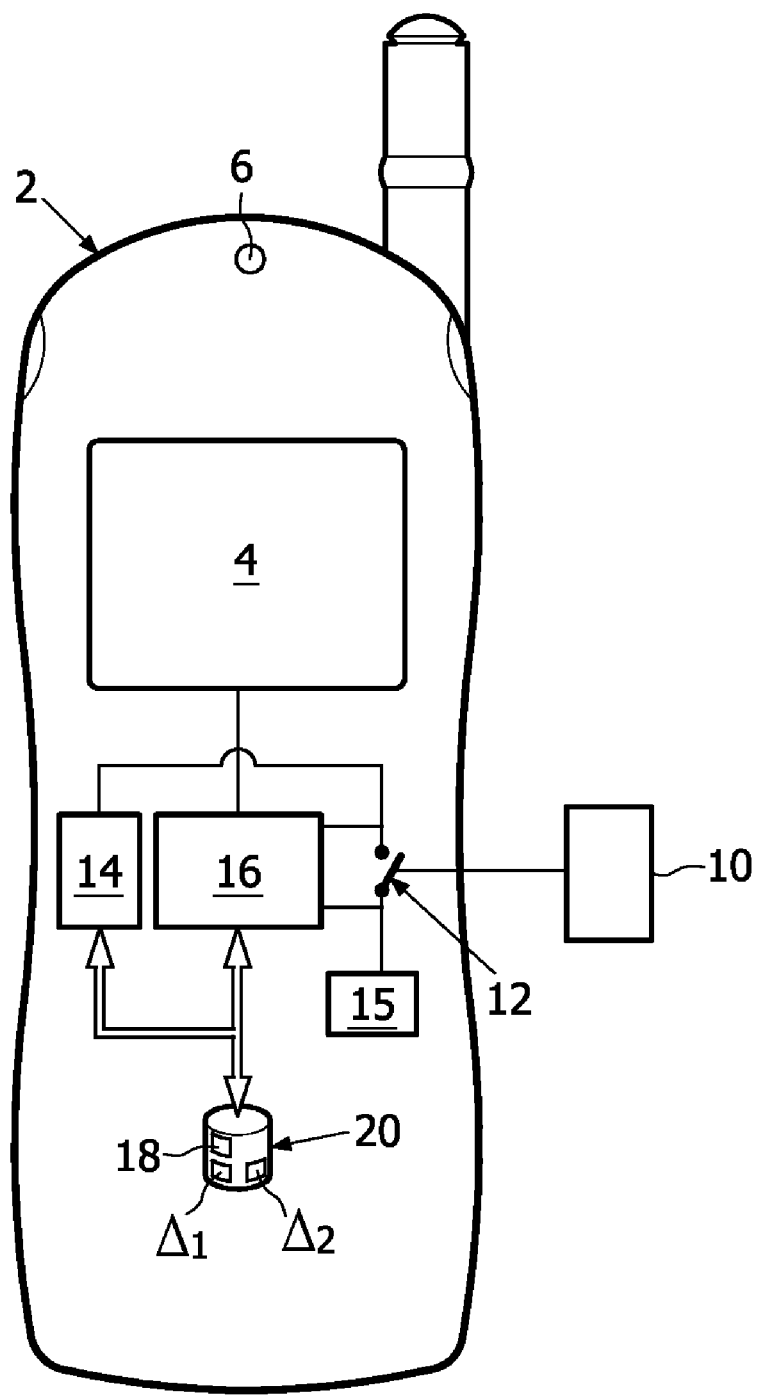
FIG. 1 is a schematic diagram of the structure of a portable terminal.

FIG. 1 shows a portable terminal 2. For example, portable terminal 2 is a mobile phone. In FIG. 1, for simplicity, only the details necessary to understand the invention are shown.

Terminal 2 has a Liquid Crystal Display (LCD) 4 to present information to the user when terminal 2 is powered on, and a LED (Light Emitting Diode) indicator 6 that shines when terminal 2 is powered on.

Terminal 2 has also a key 10, which is manually operable by a user to power up terminal 2. For example, key 10 must be depressed by the user to power up terminal 2.

Key 10 is mechanically linked to an electrical switch 12 that is open when key 10 is in an idle position and that is closed when key 10 is in an active position, i.e. depressed.

Switch 12 is connected to an electronic calculator 14. When switch 12 is closed, current may fully pass through switch 12 to power-on terminal 2. Current is drawn from a battery 15, for example.

Figure 2:
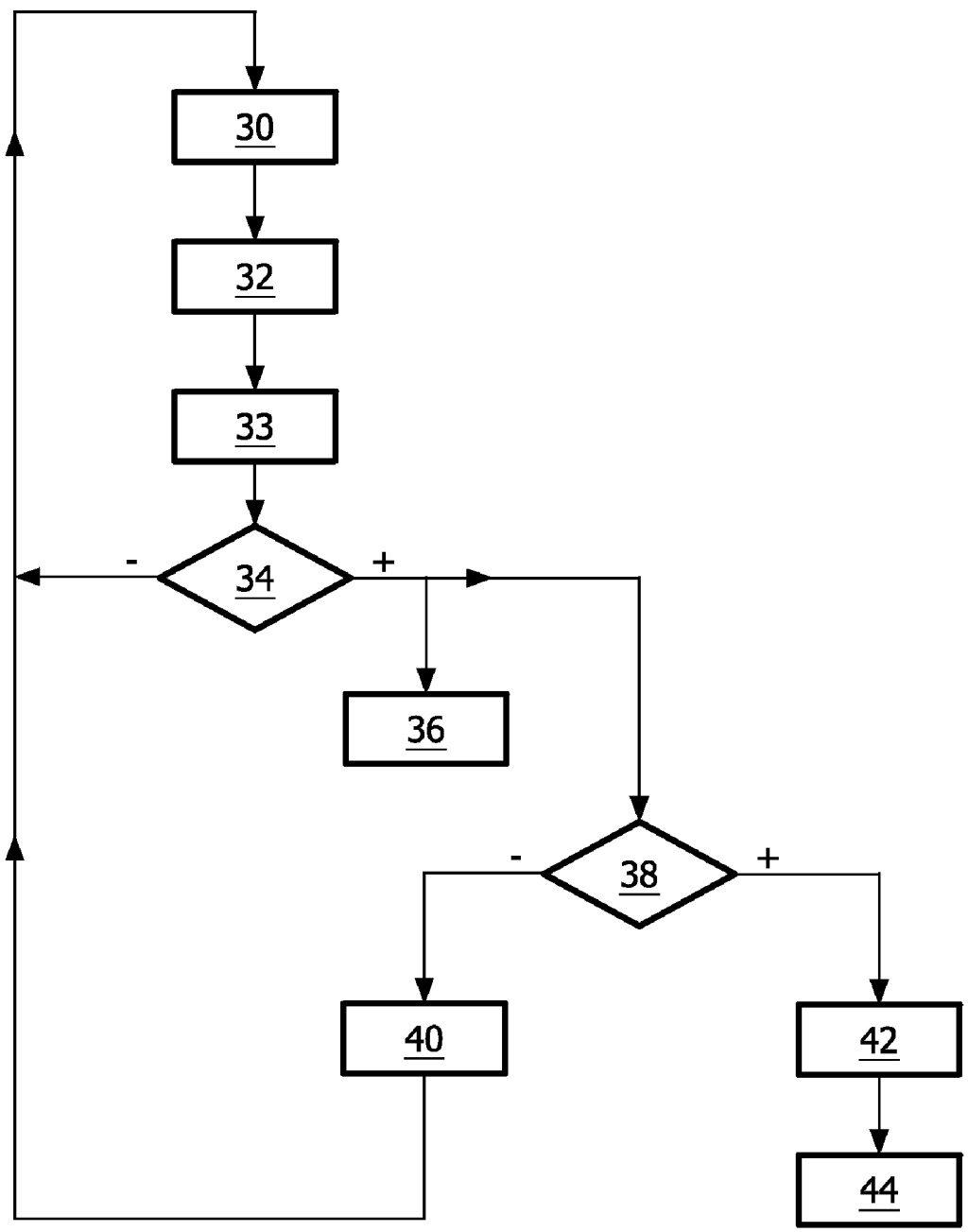
FIG. 2 is a flowchart of a method of powering up the portable terminal of FIG. 1.

Calculator 14 is configured to execute the method of FIG. 2 to power up terminal 2.

Terminal 2 has a power-up key debounce device 16. Device 16 checks that key 10 is continuously depressed during a time interval $\Delta_2$ before triggering the full powering of terminal 2. Device 16 is the only component of terminal 2 which is powered even if key 10 is not depressed, for example.

Calculator 14 is intended to automatically execute software programs like, for example, an operating system 18 when terminal 2 is powered on. Operating system 18 is recorded in a memory 20 linked to calculator 14.

Operating system 18 is designed to manage all the hardware functions of terminal 2 like the ones needed to receive incoming calls or to call other telephones.

Calculator 14 is realized with a programmable calculator capable of executing instructions recorded in a memory, like memory 20.

Memory 20 is also linked to device 16, for example.

Memory 20 also stores a predetermined time interval $\Delta_1$ and interval $\Delta_2$. The value of interval $\Delta_1$ is chosen long enough to check that key 10 has not been inadvertently depressed. For example, interval $\Delta_1$ is longer than 500 ms and shorter than 3 s. Here, interval $\Delta_1$ is equal to 1 s.

Interval $\Delta_2$ is chosen long enough to cause the bounces of switch 12 that occur when key 10 is depressed, to cease. For example, interval $\Delta_2$ is longer than 5 ms and shorter than 100 ms. Here, interval $\Delta_2$ is equal to 14 ms.

The operation of terminal 2 will now be described with reference to FIG. 2.

Initially, in step 30, terminal 2 is powered off and only device 16 is powered on.

Thereafter, in step 32, key 10 is depressed. Switch 12 closes and device 16 triggers a timer. When key 10 is depressed this means that key 10 is in its active position.

In step 33, device 16 checks that switch 12 remains continuously closed or open during time interval $\Delta_2$. In case switch 12 switches from a closed state to an open state or vice versa before the end of time interval $\Delta_2$, device 16 resets the timer and a new time interval $\Delta_2$ is counted from the beginning.

In step 34, when time interval $\Delta_2$ has elapsed, if switch 12 is open, this means that key 10 was inadvertently depressed and the method returns to step 30.

Otherwise, if switch 12 is closed at the end of time interval $\Delta_2$, powering up of terminal 2 starts.

Subsequently, in step 36, calculator 14 starts running software programs like operating system 18. During step 36, no information according to which terminal 2 is powered on is presented to the user. For example, display 4 and indicator 6 are switched off.

In parallel to step 36, in step 38, calculator 14 checks that key 10 is continuously depressed from the end of interval $\Delta_2$ to the end of interval $\Delta_1$. For example, a new timer is triggered at the beginning of step 36 to measure the elapsed time since the end of time interval $\Delta_2$. This new timer is used to determine when time interval $\Delta_1$ ends.

If key 10 is not continuously depressed, calculator 14 immediately proceeds to step 40 during which calculator 14 stops running software programs and powers off terminal 2.

After step 40, the method returns to step 30.

If key 10 has been continuously depressed from the end of interval $\Delta_2$ to the end of interval $\Delta_1$, then, when interval $\Delta_1$ has elapsed, in step 42, calculator 14 continues running software programs started during step 36 and, in step 44, presents information to the user according to which terminal 2 is powered on. For example, in step 44, display 4 is switched on and indicator 6 shines.

During interval $\Delta_2$, terminal 2 is not powered. As a result, very short depression of key 10 or bounces do not trigger the powering up of terminal 2.

At the end of interval $\Delta_2$, terminal 2 is powered on and software programs start running. Therefore, at the end of time interval $\Delta_1$, software programs are already initialized and the user does not have to wait before starting to fully use terminal 2.

Many additional embodiments are possible. For example, in another embodiment, step 38 only consists of checking at the end of interval $\Delta_1$ that key 10 is still depressed. In this embodiment, it is not checked that key 10 is continuously depressed from the end of interval $\Delta_2$ to the end of interval $\Delta_1$.

Similarly, in another embodiment, time interval $\Delta_2$ is only counted from the first time when switch 12 has been closed and cannot be reset. In this embodiment interval $\Delta_2$ is chosen long enough to allow switch bounces to cease.

Preferably, device 16 is configured to count intervals $\Delta_1$ and $\Delta_2$ and to switch off processor 14 if key 10 is not continuously depressed from the end of interval $\Delta_2$ to the end of interval $\Delta_1$.

Device 16 and switch 12 may be combined to form only one device.

The invention claimed is:

1. A method of powering up a portable terminal which automatically executes a software program when powered on, the terminal having a manually operated power-up key, wherein the method comprises the steps of:
    a) at the beginning, moving the key from an idle position, in which the terminal is powered off to an active position in which the terminal is to be powered on, then
    b) before a first predetermined time interval has elapsed since the beginning of step a), starting to run the software program on the terminal, the first time interval being long enough to check that the key has not been inadvertently moved, then
    c) when the first time interval has elapsed, if the key is still in the active position, continuing to run the software program, else powering down the terminal.

2. The method according to claim 1, wherein step b) is only triggered after a second time interval has elapsed, the second time interval being shorter than the first time interval and being used to cause bounces to cease that occur when the key is moved.

3. The method according to claim 2, wherein during a third time interval beginning when the second time interval has elapsed and ending when the first time interval has elapsed the method comprises a step of checking that the key continues to remain in the active position during the third time interval.

4. The method according to claim 1, wherein the first time interval is longer than 500 ms and shorter than 3 s.

5. The method according to claim 2, wherein the second time interval is longer than 5 ms and shorter than 100 ms.

6. A memory having code instructions to execute a method according to claim 1 when the instructions are executed by an electronic calculator.

7. A terminal automatically executing a software program when powered on, said terminal comprising:
    a manually operated power-up key, and
    a calculator configured to execute a method according to claim 1.

* * * * *